(12) United States Patent
Yoshida

(10) Patent No.: US 6,448,528 B1
(45) Date of Patent: Sep. 10, 2002

(54) TUBULAR ELECTRODE HOLDER

(75) Inventor: Shigeru Yoshida, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/720,093

(22) PCT Filed: Apr. 21, 2000

(86) PCT No.: PCT/JP00/02649

§ 371 (c)(1),
(2), (4) Date: Dec. 21, 2000

(87) PCT Pub. No.: WO00/64617

PCT Pub. Date: Nov. 2, 2000

(30) Foreign Application Priority Data

Apr. 21, 1999 (JP) ............................................ 11-113151

(51) Int. Cl.⁷ ................................................ B23H 7/26
(52) U.S. Cl. ....................... 219/69.15; 269/69.2; 279/20
(58) Field of Search ........................... 219/69.14, 69.15, 219/69.2; 279/2.02, 2.03, 2.04, 20, 52; 204/224 M, 297.01; 205/651

(56) References Cited

U.S. PATENT DOCUMENTS

| 4,538,043 | A | * | 8/1985 | Alexander | ............... | 219/69.15 |
| 4,990,737 | A | * | 2/1991 | Obara | ..................... | 219/69.11 |
| 5,420,388 | A | * | 5/1995 | Girardin | .................. | 219/69.15 |
| 5,593,258 | A | * | 1/1997 | Matsumoto et al. | | |
| 5,977,503 | A | * | 11/1999 | Leach et al. | ............. | 219/69.15 |

FOREIGN PATENT DOCUMENTS

| JP | 64-11735 | * | 1/1989 | ............. | 219/69.15 |
| JP | 1-246021 | * | 10/1989 | ............. | 219/69.11 |

* cited by examiner

Primary Examiner—Geoffrey S. Evans
(74) Attorney, Agent, or Firm—McDermott, Will & Emery; Paul Devinsky

(57) ABSTRACT

A pipe electrode holder for holding an elongated pipe electrode (6) having a relatively small diameter, the pipe electrode holder being coaxially attached to a rotating spindle (7) of a small hole electric discharge machine. The pipe electrode holder has a cylinder capable of fitting into the rotating spindle, the cylinder having a threaded upper end and a through hole (1a), and a collet (2) for gripping the pipe electrode having a through hole (2a) through which the pipe electrode may pass, the collet being fit into the through hole of the cylinder. A holder head (5) capable of adjusting the gripping force of the collet is not screwed to the lower end of the cylinder from which the pipe electrode extends, but to the threaded upper end of the cylinder.

16 Claims, 5 Drawing Sheets

TUBULAR ELECTRODE HOLDER

FIELD OF THE INVENTION

The present invention relates to a small hole electric discharge machine and more particularly to a small hole electric discharge machine for forming ultrafine holes in a workpiece by generating electric discharge between a rotating long thin pipe electrode and the workpiece, and more particularly still to a pipe electrode holder for holding the pipe electrode, which can be attached to a rotating spindle of the small hole electric discharge machine so that the pipe electrode is arranged coaxially with the rotating spindle.

BACKGROUND OF THE INVENTION

When forming a start hole in a workpiece in order to pass a wire electrode through, for example, a small hole electric discharge machine is utilized that uses a copper or copper alloy pipe electrode having an external diameter of 0.30 to 0.05 mm. The pipe electrode is arranged vertically coaxial with a rotating spindle holder of the small hole electric discharge machine by a pipe electrode holder. By causing electric discharge between the pipe electrode and the workpiece, and feeding the pipe electrode downwards, an ultrafine hole is formed in the workpiece. During machining, dielectric fluid is supplied to the hole being formed in the workpiece by being passed through the pipe electrode. The inner diameter of the pipe electrode is normally 0.12 mm when the external diameter is 0.30 mm, 0.07 mm when the external diameter is 0.15 mm, and 0.04 mm when the external diameter is 0.1 mm. It is known that these types of small diameter pipe electrodes are severely consumed during machining. The length to which the pipe electrode is consumed may be the same or even greater than the extent to which the pipe electrode is moved downwards. In order to reduce the frequency of replacing the pipe electrode, the pipe electrode has a length a few hundred times larger than the outer diameter, namely 100–500 mm. A small hole electric discharge machine has a power supply for supplying current to the pipe electrode, and a fluid supply device for supplying dielectric fluid into the pipe electrode.

Japanese Patent Laid-open No. 8-290332 discloses a pipe electrode holder including a collet for gripping a pipe electrode. The collet is fitted into a through hole of a cylinder, and an upper end of the cylinder is capable of being attached to a lower end of a rotating spindle of the small hole electric discharge machine, while a lower end of the cylinder is screwed into a cap nut. An operator first inserts the pipe electrode into a through hole of the collet from the lower end of the cylinder. The force with which the collet holds the pipe electrode can be adjusted by tightening the cap nut. If the cap nut is tightened, the collet moves upward in the axial direction. In this way, a vertical joint in the collet is closed up to hold the pipe electrode tightly. During this operation, it is quite common for accidents to occur where the operator touches the pipe electrode causing it to become bent.

DISCLOSURE OF THE INVENTION

An object of the present invention is to provide a pipe electrode holder capable of moving a collet in an axial direction at an upper side of a cylinder to close a joint in the collet, so that an operator does not bend the pipe electrode.

Another object of the present invention is to provide a pipe electrode holder having a pipe electrode reliably arranged coaxial with a rotating spindle of a small hole electric discharge machine when the pipe electrode holder is attached to the rotating spindle.

Other objects of the present invention will become clear to a person skilled in the art upon reference to the following description and practicing the invention.

In order to achieve the above described objects, a pipe electrode holder for holding a pipe electrode, according to the present invention, is capable of being coaxially attached to a rotating spindle of a small hole electric discharge machine, and comprises a cylinder (1) capable of being fitted into a rotating spindle (7), having a threaded upper end and a through hole (1a), a collet (2), having a hole (2a) through which the pipe electrode (6) passes, fitted into the through hole of the cylinder, for gripping a pipe electrode, and a holder head (5) for screwing into the threaded upper end of the cylinder so as to make the gripping force of the collet adjustable.

Preferably, the pipe electrode holder further comprises an elastic seal block (4), having a through hole (4a) through which the pipe electrode passes, fitted into the through hole of the cylinder between the collet and the holder head.

More preferably, the pipe electrode holder further comprises a washer (3), having a through hole (3a) through which the pipe electrode passes, fitted into the through hole of the cylinder between the collet and the seal block.

The collet preferably has a first tapered surface (2d) with a joint, and the washer preferably has a tapered surface (3d) for engaging with the first tapered surface.

The collet also preferably has a second tapered surface (2c, 2e) having a joint, and a tapered surface (1c, 1h) for engaging with the second tapered surface is formed in the through hole of the cylinder.

In order to reliably arrange the pipe electrode coaxially with the rotating spindle, a flange (1f) extending radially and capable of contacting a bottom surface of the rotating spindle is preferably formed in the cylinder.

A flange (5d) extending radially and capable of contacting a top face of the cylinder is preferably formed on the holder head.

DETAILED DESCRIPTION OF THE PREFERRED EMBODIMENTS

Figure 1:
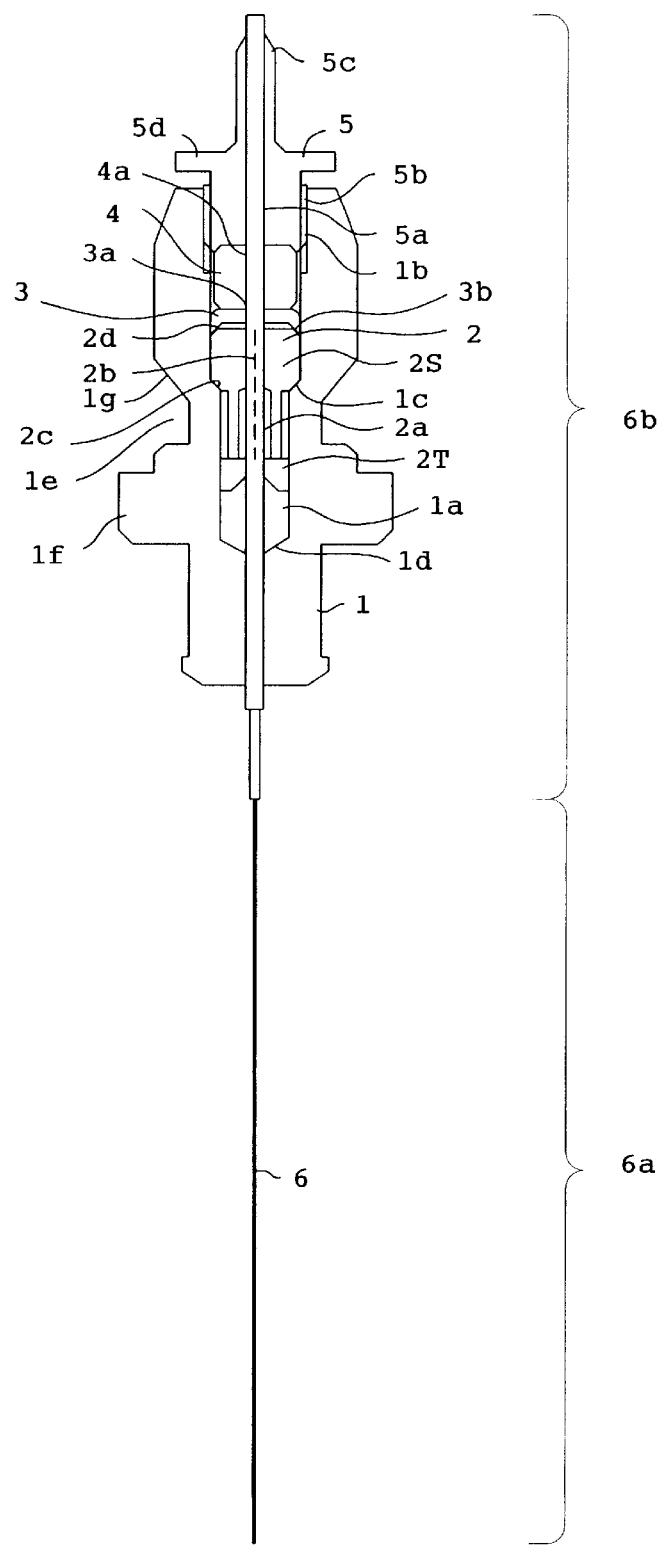
FIG. 1 is a vertical cross sectional drawing illustrating a pipe electrode holder of the present invention.

A preferred embodiment of a pipe electrode holder according to the present invention will now be described with reference to FIG. 1 and FIG. 2.

In the illustrated embodiment, a pipe electrode 6 comprises a section 6a having an external diameter of about 0.30–0.05 mm and a length of about 180 mm, and a shank part 6b having an external diameter larger than that of the section 6a and a length of about 70 mm. The shank part 6b for inserting into a pipe electrode holder has an internal diameter of about 1.0 mm so that the pipe electrode is not smashed. The pipe electrode holder is comprised of a cylinder 1, a collet 2, a washer 3, a seal block 4, and a holder head 5.

The cylinder 1 has a through hole 1a passing through it. A female screw 1b is formed in an upper end of the through hole 1a. The internal diameter of the through hole 1a is reduced stepwise from an upper end to a lower end at shoulders 1c and 1d. The shoulder 1c has an about 450 tapered surface. The internal diameter of the through hole 1a further down than the shoulder 1d is slightly larger than the shank part 6b, for example, about 1.010 mm. An annular groove 1e is formed in an outer surface of the cylinder 1, and a flange 1f extending in the radial direction is formed further down than the annular groove 1e. A side surface 1g above the annular groove 1e is a tapered surface converging downwards. As shown in FIG. 2, the collet 2, washer 3 and seal block 4 are sequentially fitted into the through hole 1a from an upper end of the cylinder 1. After that, the holder head 5 capable of adjusting the gripping force of the collet 2 is screwed to the upper end of the cylinder 1. Assembly of the pipe electrode holder is thus completed.

The collet 2 is made from a material having good electrical conductivity, such as beryllium alloy, and has a through hole 2a for insertion of the pipe electrode 6 in the center. The collet 2 is made up of a slide joint section 2S having four joints 2b formed at equal intervals extending in the radial direction, and a tubular section 2T not containing the joints 2b. An about 45° tapered surface 2c for engaging with the tapered surface 1c of the cylinder 1 is formed on the slide joint section 2S. An about 45° tapered surface 2d is also formed on an upper end of the slide joint section The washer 3 has a through hole 3a for insertion of the pipe electrode 6 in its center, and a tapered surface 3b for engaging with the tapered surface 2d of the slide joint section 2S.

The seal block 4 is generally cylindrical and is made of an elastic material such as rubber, and has a through hole 4a for insertion of the pipe electrode 6 in its center. A bottom surface of the seal block 4 comes into contact with the top face of the washer 3. A bottom surface of the holder head 5 comes into contact with a top face of the seal block 4.

The holder head 5 has a through hole 5a for insertion of the pipe electrode 6 in its center. A male screw 5b, adopted to be for being screwed into the female screw 1b of the cylinder 1 is formed on a lower end of the holder head 5. A protruding section 5c of about 3 mm extending in the axial direction is formed on the upper end of the holder head 5. Also, a flange 5d having, for example, a hexagonal or rectangular cross section and extending in the radial direction is formed between the male screw 5b and the protruding section 5c.

The procedure for fixing the pipe electrode 6 to the pipe electrode holder will now be described with reference to FIG. 1.

First, the male screw 5b of the holder head 5 is loosened so that the flange 5d is separated from the top face of the cylinder 1 by a distance of about 1–2 mm. The shank part 6b of the pipe electrode 6 is inserted into the through hole 1a of the cylinder 1 from a lower end of the cylinder 1. A tip end of the shank part 6b of the pipe electrode 6 passes through the through hole 2a of the collet 2, the through hole 3a of the washer 3, the through hole 4a of the seal block 4 and the through hole 5a of the holder head 5, and projects, e.g., a few mm, from the top face of the holder head 5. Finally, the male screw 5b of the holder head 5 is tightened up until the flange 5d comes into contact with the top face of the cylinder 1. Inclination of the holder head 5 is corrected by the contact of the top face of the cylinder 1 and the flange 5d, and the pipe electrode 6 and the cylinder 1 are arranged coaxially. Lowering of the holder head 5 pressurizes the seal block 4, and the suppression force of the seal block 4 causes the washer 3 and the collet 2 to be moved downwards. As a result, the tapered surface 3b of the washer 3 slides on the tapered surface 2d of the slide joint section 2S, and the tapered surface 2c of the slide joint section 2S slides on the tapered surface 1c of the cylinder 1. The joints 2b of the collet 2 are closed up so that gripping claws of the collet 2 grip the pipe electrode 6. The dimensions of the tapered surface 1c, the collet 2, the washer 3, the seal block 4, the male screw 5b and the flange 5d are designed so that the compressed seal block 4 reliably seals the collet 2 and it is possible for the collet 2 to generate a suitable gripping force. Accordingly, contact between the top face of the cylinder 1 and the flange 5d can always ensure a suitable gripping force. Since the washer 3 is positioned between the seal block 4 and the collet 2, the compressed seal block 4 is prevented from getting into the joints of the slide joint section 2S.

Figure 3:
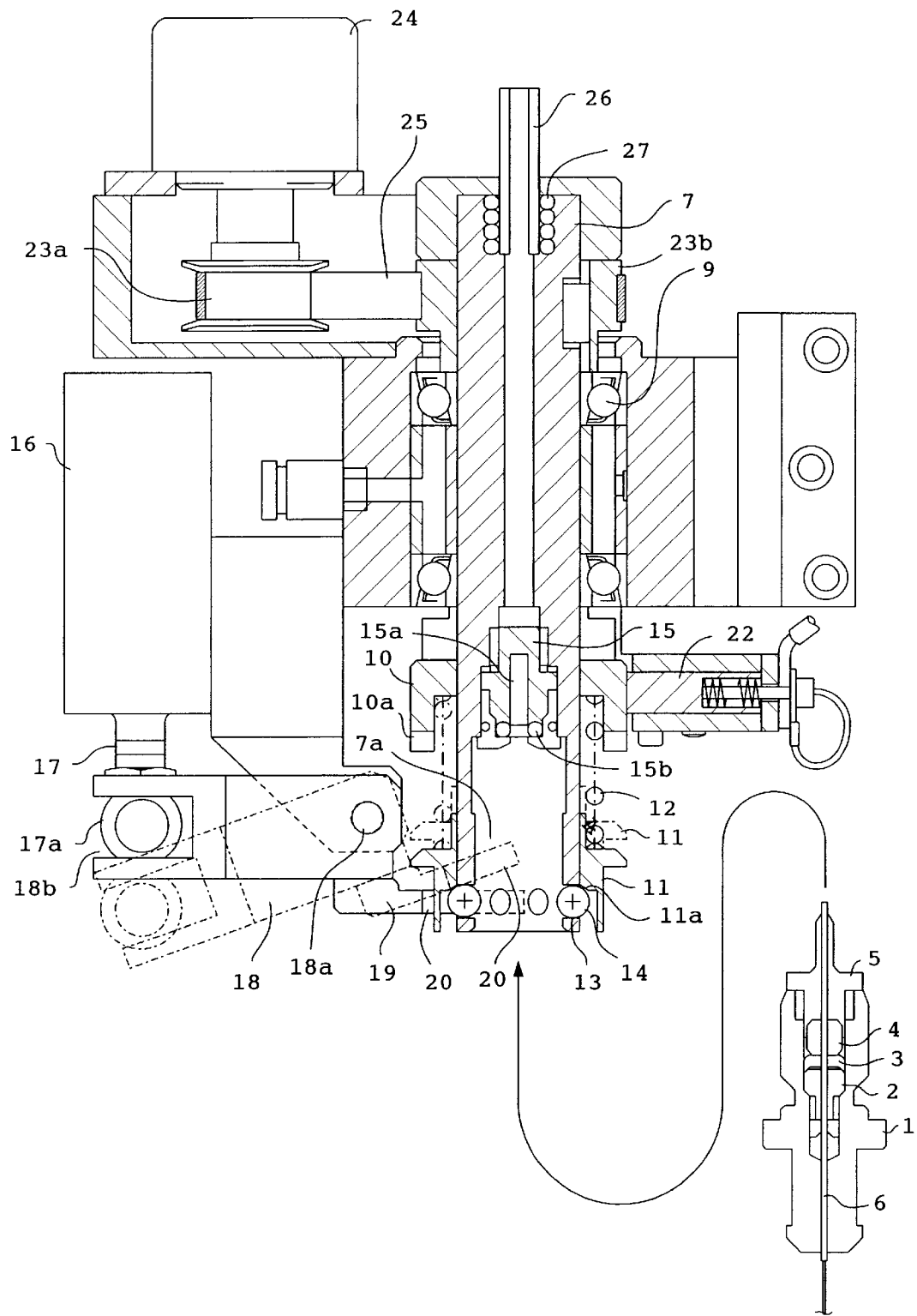
FIG. 3 is a vertical cross sectional drawing illustrating a rotating spindle of an electric discharge machine, to which the pipe electrode holder of FIG. 1 can be attached.
Figure 4:
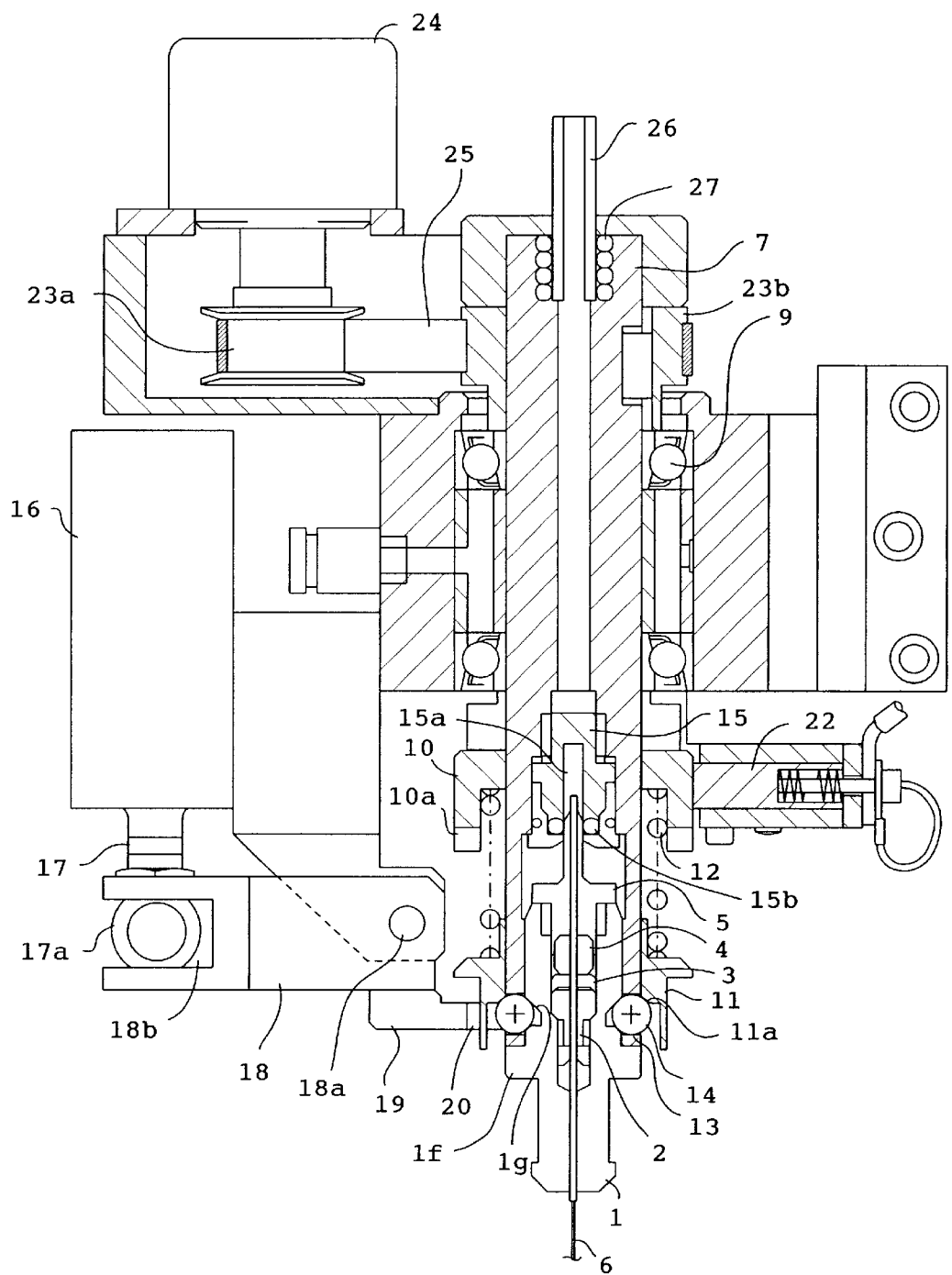
FIG. 4 is a vertical cross sectional drawing illustrating a rotating spindle of an electric discharge machine, to which the pipe electrode holder of FIG. 1 is attached.

A rotating spindle of a small hole electric discharge machine to which the pipe electrode holder of FIG. 1 can be attached will now be described with reference to FIG. 3 and FIG. 4.

A hollow spindle 7 of the small hole electric discharge machine is rotatably vertically supported by a bearing 9. The diameter of a through hole 7a of the spindle 7 becomes larger at a lower end side of the spindle 7 so as to accommodate the pipe electrode holder. A supply pipe 26 is fitted to an upper end of the spindle 7 using an O-ring 27 in order to supply dielectric fluid to the through hole 7a. A timing belt 25 is suspended across a pulley 23b fitted to the spindle 7 and a pulley 23a fitted to an output shaft of a motor 24. A beryllium alloy coil spring holder 10 provided with a heat sink fin 10a is fastened to an outer surface of the spindle 7. A current feeding brush 22 is pressure welded to the outer surface of the coil spring holder 10. A sleeve 11 is provided capable of sliding on the outer surface of the spindle 7. A coil spring 12 is held between the coil spring holder 10 and the sleeve 11, and urges the sleeve 11 downwards. A plurality of holes 13 formed in the spindle 7 are arrayed circumferentially at equal intervals around the axis of the spindle 7. A plurality of balls 14 are respectively arranged inside the holes 13. A tapered surface 11a of the sleeve 11 presses the balls 14 radially against an inner side. A lower end of the sleeve 11 comes into contact with a U-shaped arm 20, and the arm 20 is attached to one end of a lever 18 by a support bar 19. The lever 18 is pivotably supported on a shaft 18a, and an indent 18b is formed in the other end of the lever 18. A cylindrical member 17a fitted to a tip end of a piston rod 17 capable of reciprocating inside an air cylinder 16 is fitted into the indent 18b. An O-ring case 15 is inserted into the through hole 7a of the spindle 7, and has a hole 15a for accommodating the protruding section 5c of the holder head 5. The O-ring 15b is provided to seal up a gap between the O-ring case 15 and the protruding section 5c.

Attachment of the pipe electrode holder to the spindle 7 will now be described.

First, by moving the piston rod 17 downwards, the arm 20 attached to the lever 18 acts against the spring force of the coil spring 12 to raise the sleeve 11 to an unclamped position. At this time, the lever 18, arm 20 and sleeve 11 are as shown by the imaginary line in FIG. 3. Next, the protruding section 5c of the holder head 5 is made to confront the spindle 7, and the pipe electrode holder is fitted into the through hole 7a so as to be arranged coaxial with the spindle 7. The protruding section 5c of the holder head 5 is inserted into the hole 15a. Finally, by moving the piston rod 17 upwards, the sleeve 11 is released from the arm 20 and is lowered to a clamped position under the spring force of the coil spring 12. The pipe electrode holder when the sleeve 11 is in the clamped position is shown in FIG. 4. The balls 14 are pressed radially against an inner side by the tapered surface 11a and engage with an annular groove 1e in the cylinder 1. In this way, the pipe electrode holder is restrained by the balls 14. At this time, the balls 14 are in contact with the tapered surface 1g of the cylinder 1, the tapered surface 11a of the sleeve 11 and a lower surface of the hole 13. As the balls 14 are supported at these three contact points, a component of force acting on the balls 14 presses the pipe electrode holder upward. As the flange 1f of the cylinder 1 is pressured to stick fast to the bottom surface of the spindle 7, the cylinder 1 is reliably arranged coaxially with the spindle 7. During machining, current is supplied to the pipe electrode 6 through the brush 22, the coil spring holder 10, the spindle 7, the balls 14, the cylinder 1 and the collet 2, and dielectric fluid is supplied at a high pressure of, for example, about 60–80 kg/cm² from the supply pipe 26 through the through hole 7a of the spindle 7 and the hole 15a of the O-ring case 15 to the inside of the pipe electrode 6. If the sleeve 11 is returned again to the unclamped position, the pipe electrode holder can be lowered down and pulled out.

Another example of pipe electrode holder according to the present invention will now be described with reference to FIG. 5.

Figure 2:
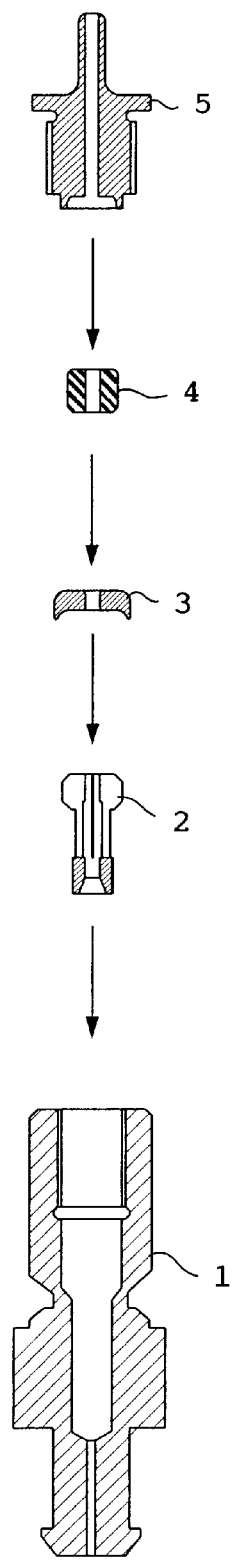
FIG. 2 is an exploded view illustrating the pipe electrode holder of FIG. 1.

Reference numbers that are the same as those used in FIG. 1 will be attached to the same elements, and detailed description of those elements will be omitted.

Figure 5:
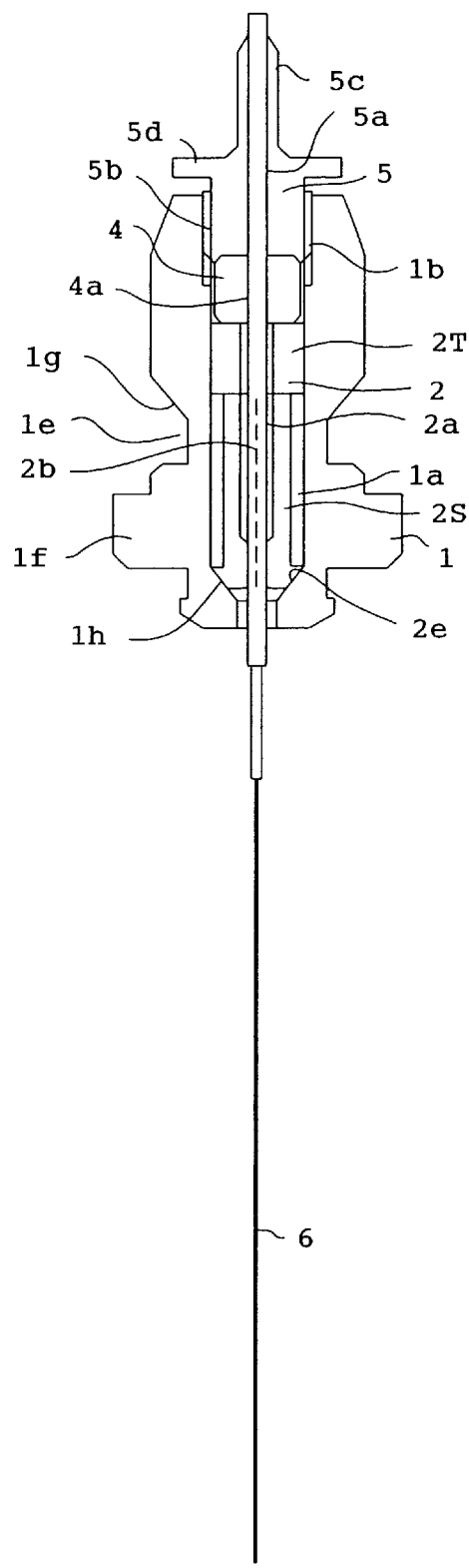
FIG. 5 is a vertical cross sectional drawing illustrating another pipe electrode holder of the present invention.

The collet 2 in FIG. 5, similarly to the collet 2 in FIG. 1, comprises a slide joint section 2S having four joints 2b formed at equal intervals extending in the radial direction, and a tube section 2T. An about 45° tapered surface 2e formed on a lower end of the slide joint section 2S is engaged with a tapered surface 1h converging downwards formed in the through hole 1a. A bottom surface of the seal block 4 is in contact with a top face of the tube section 2T not containing the joints 2b, which means that the washer 3 in FIG. 1 is not necessary. Similarly to the pipe electrode holder in FIG. 1, the gripping force of the collet 2 is adjusted by the holder head 5. The seal block 4 is compressed by tightening the male screw 5b of the holder head 5, and the elastic force of the seal block 4 causes the collet 2 to move downwards. As a result, the tapered surface 2e of the collet 2 slides on the tapered surface 1h of the cylinder 1. The joints 2b of the collet 2 are then closed so as to grip the pipe electrode 6 with the gripping claws of the collet 2.

The present invention is not intended to be limited to the forms disclosed. Various improvements and variations are clearly possible upon reference to the above description. For example, it is possible to form at least one joint 2b in the collet 2, and it is possible to use a suitable well known collet 2 for gripping an elongated electrode. The illustrated embodiments have been selected simply to describe the essence and practical application of the invention. The scope of the invention is defined in the attached claims.

What is claimed is:

1. A pipe electrode holder for holding a pipe electrode, said electrode holder being adapted to be coaxially attached to a rotating spindle of a small hole electric discharge machine, comprising, a cylinder capable of being fitted into the rotating spindle, said cylinder having a threaded upper end and a through hole;

a collet having a hole through which the pipe electrode may pass, said collet being fitted into the through hole of the cylinder for gripping a pipe electrode; and a holder head having a portion adapted to mate with the threaded upper end of the cylinder whereby the gripping force of the collet is adjustable.

2. The pipe electrode holder according to claim 1, further comprising an elastic seal block having a through hole through which the pipe electrode may pass, said seal block being fitted into the through hole of the cylinder above the collet.

3. The pipe electrode holder according to claim 2, wherein said pipe electrode holder is configured such that lowering the holder head increases the gripping force of the collet and compresses the seal block.

4. The pipe electrode holder according to claim 3, wherein the joint section of said collet has a second tapered surface, and wherein said cylinder includes a tapered surface for engaging with the second tapered surface of said collet.

5. The pipe electrode holder according to claim 3, wherein said cylinder further comprises a flange extending radially and adapted to contact a bottom surface of the rotating spindle.

6. The pipe electrode holder according to claim 3, wherein the cylinder has a top face and said holder head further comprises a flange extending radially and adapted to contact the top face of said cylinder.

7. The pipe electrode holder according to claim 3, wherein the pipe electrode holder further comprises a washer having a through hole through which the pipe electrode may pass, said washer being fitted into the through hole of the cylinder between the collet and the seal block and wherein the collet includes a joint section having a first tapered surface, and the washer has a tapered surface for engaging with the first tapered surface of the collet.

8. The pipe electrode holder according to claim 1, wherein at least one of the threaded upper end and the holder head is adapted to engage a portion of the rotating spindle when the pipe electrode holder is attached to the rotating spindle.

9. The pipe electrode holder according to claim 1, wherein the cylinder is configured such that the pipe electrode extends out from said cylinder through an end of said cylinder opposite to the threaded upper end.

10. The pipe electrode holder according to claim 1, wherein the cylinder further includes a lower end, said threaded upper end being adapted to be positioned closer to the rotating spindle than the lower end when the pipe electrode holder is attached to the rotating spindle.

11. The pipe electrode holder according to claim 1, wherein the pipe electrode holder further comprises an elastic seal block having a through hole through which the pipe electrode may pass, said seal block being fitted into the through hole of the cylinder between the collet and the holder head.

12. A pipe electrode holder for holding a pipe electrode, said electrode holder being adapted to be coaxially attached to a rotating spindle of a small hole electric discharge machine, comprising:

a cylinder capable of being fitted into the rotating spindle;

a collet fitted into the cylinder for gripping a pipe electrode; and a holder head provided on the cylinder above the collet for adjusting the gripping force of the collet.

13. The pipe electrode holder according to claim 12, further comprising an elastic seal block fitted into the cylinder, said holder head being operable to compress the seal block.

14. A pipe electrode holder for holding a pipe electrode which extends downward from a lower end of the pipe electrode holder, comprising, a collet for gripping a pipe electrode; and a holder head forming an upper end of the pipe electrode holder, said holder head being operable to adjust the gripping force of the collet.

15. The pipe electrode holder according to claim 14, further comprising a cylinder into which the collet is fitted and an elastic seal block fitted into the cylinder, said holder head being operable to compress the seal block.

16. The pipe electrode holder of claim 15, wherein the cylinder has a threaded upper end and the holder head has a portion adapted to mate with the threaded upper end.

\* \* \* \* \*